(12) United States Patent
Baaijens et al.

(10) Patent No.: US 9,689,555 B2
(45) Date of Patent: Jun. 27, 2017

(54) LIGHTING DEVICE AND LIGHTING SYSTEM

(71) Applicant: PHILIPS LIGHTING HOLDING B.V., Eindhoven (NL)

(72) Inventors: Johannes Petrus Wilhelmus Baaijens, Eindhoven (NL); Dragan Sekulovski, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 35 days.

(21) Appl. No.: 14/438,643

(22) PCT Filed: Oct. 17, 2013

(86) PCT No.: PCT/IB2013/059414
§ 371 (c)(1),
(2) Date: Apr. 27, 2015

(87) PCT Pub. No.: WO2014/064582
PCT Pub. Date: May 1, 2014

(65) Prior Publication Data
US 2015/0300597 A1    Oct. 22, 2015

Related U.S. Application Data

(60) Provisional application No. 61/718,824, filed on Oct. 26, 2012.

(51) Int. Cl.
*F21S 4/00* (2016.01)
*F21V 7/00* (2006.01)
(Continued)

(52) U.S. Cl.
CPC ............ *F21V 7/0016* (2013.01); *F21S 8/026* (2013.01); *F21S 8/061* (2013.01); *F21V 14/003* (2013.01);
(Continued)

(58) Field of Classification Search
CPC ......... F21S 8/026; F21S 8/061; F21V 14/003; F21V 7/0016; F21Y 2101/02;
(Continued)

(56) References Cited

U.S. PATENT DOCUMENTS 7,494,246 B2   2/2009   Harbers et al.
8,044,415 B2   10/2011  Messere et al.
(Continued)

FOREIGN PATENT DOCUMENTS

EP    1275898 A2    1/2003
JP    2006049026A A 2/2006
(Continued)

OTHER PUBLICATIONS

WO 2011/105854, Sep. 1, 2011, Shin (English Translation).*

*Primary Examiner* — Peggy Neils

(57) ABSTRACT

A lighting device (1) comprising a housing (3) with a light emission window (5) and, opposite thereto, a reflector (7). A planar light transmissive carrier (9) arranged in between the light emission window and the reflector and comprising, at least on a side (11) facing towards the reflector, a grid (13) of a plurality of light sources (15,17). The plurality of light sources comprise a first group (19) of first light sources (15) and a second group (21) of second light sources (19). Each first light source has a respective first emission orientation (23) in a respective first direction (25) away from the reflector and each second light source has a respective second emission orientation (31) to issue light towards the reflector, which light, after reflection, is redirected into a respective first direction (25a). The lighting device is able to provide accent lighting and/or diffuse lighting issued by light sources arranged on one planar carrier.

10 Claims, 3 Drawing Sheets

(51) Int. Cl.
 *F21S 8/02* (2006.01)
 *F21S 8/06* (2006.01)
 *F21V 14/00* (2006.01)
 *F21Y 105/12* (2016.01)
 *F21Y 105/10* (2016.01)
 *F21Y 115/10* (2016.01)
 *F21Y 107/50* (2016.01)
 *F21Y 113/13* (2016.01)

(52) U.S. Cl.
 CPC ....... *F21Y 2105/10* (2016.08); *F21Y 2105/12* (2016.08); *F21Y 2107/50* (2016.08); *F21Y 2113/13* (2016.08); *F21Y 2115/10* (2016.08)

(58) Field of Classification Search
 CPC ......... F21Y 2105/001; F21Y 2105/003; F21Y 2105/005; F21Y 2113/005
 See application file for complete search history.

(56) References Cited

U.S. PATENT DOCUMENTS

| | | | | |
|---|---|---|---|---|
| 8,705,163 | B2* | 4/2014 | Biegelsen | G02B 26/026 359/296 |
| 9,057,493 | B2* | 6/2015 | Simon | F21K 9/17 |
| 9,140,421 | B2* | 9/2015 | Yeh | F21S 8/04 |
| 2005/0243552 | A1* | 11/2005 | Maxik | F21K 9/137 362/249.01 |
| 2007/0247842 | A1 | 10/2007 | Zampini et al. | |
| 2009/0002979 | A1* | 1/2009 | Medendorp, Jr. | F21V 7/0016 362/231 |
| 2009/0002984 | A1 | 1/2009 | Liiu et al. | |
| 2009/0251057 | A1* | 10/2009 | Son | A01G 7/045 315/154 |
| 2010/0225173 | A1 | 9/2010 | Aoyama et al. | |
| 2011/0235318 | A1 | 9/2011 | Simon et al. | |
| 2012/0300437 | A1* | 11/2012 | Lu | F21V 21/005 362/147 |

FOREIGN PATENT DOCUMENTS

| | | |
|---|---|---|
| WO | WO2005108853SA1 | 11/2005 |
| WO | 2008102287 A3 | 8/2008 |
| WO | 2008146229 A2 | 12/2008 |
| WO | 2008146232 A2 | 12/2008 |
| WO | 2009087587 A1 | 7/2009 |
| WO | 2011033424 A1 | 3/2011 |
| WO | WO2011088190 A2 | 7/2011 |
| WO | 2011105854 A2 | 9/2011 |

* cited by examiner

LIGHTING DEVICE AND LIGHTING SYSTEM

CROSS-REFERENCE TO PRIOR APPLICATIONS

This application is the U.S. National Phase application under 35 U.S.C. §371 of International Application No. PCT/IB13/059414, filed on Oct. 17, 2013, which claims the benefit of U.S. Provisional Patent Application No. 61/718, 824, filed on Oct. 26, 2012. These applications are hereby incorporated by reference herein.

TECHNICAL FIELD

The invention relates to a lighting device comprising a housing comprising a light emission window and, opposite thereto, a reflector. The invention further relates to a lighting system comprising lighting devices.

BACKGROUND OF THE INVENTION

Such a lighting device is known from WO2009087587. The known lighting device comprises a light guide having a first and a second surface facing each other. The known lighting device further comprises light sources arranged to issue light source light in one direction. To shape light source light and provide shaped light, the known lighting device further comprises light shaping means, wherein the light shaping means is disposed at at least one of said surfaces. In the known lighting system the first surface is capable of providing light in the first direction and the second surface is capable of providing light in a second direction, the second direction being different from the first direction. In this manner, the known lighting device provides both accent light and diffuse light. This combination of accent and diffuse light is particularly suitable to illuminate objects such that they are rendered with a natural appearance. The accent light consists of light issued as a narrow beam in the first direction either directly, or indirectly, i.e. issued in the first direction after being reflected at the reflector. Yet, before being issued from the lighting device to the exterior, said accent light is collimated for optimization for reading or the like. The diffuse light is directed in the second direction towards the ceiling for providing background lighting. It is a disadvantage of the known lighting device that shaping of light source light by the light shaping means is realized in a relatively complex and cumbersome manner. A further disadvantage of the known lighting device is that acceptable lighting device settings to issue shaped light enabling the rendering of a natural appearance of an illuminated object to be optimized, are relatively difficult to attain.

SUMMARY OF THE INVENTION

It is an object of the invention to provide a lighting device in which at least one of the above-mentioned disadvantages is counteracted. To achieve this, the lighting device of the type as described in the opening paragraph further comprises a planar light transmissive carrier arranged in between the light emission window and the reflector and comprising, at least on a side facing towards the reflector, a grid of a plurality of light sources, the plurality of light sources comprising a first group of first light sources and a second group of second light sources, and each first light source has a respective first emission orientation in a respective first direction away from the reflector, and each second light source has a respective second emission orientation to issue light towards the reflector, which light, after reflection, is redirected substantially into a respective first direction. Planar in this respect means that the carrier has an average thickness/depth that is small compared to its length and width dimensions, for example that its depth is equal or less than $1/5^{th}$, $1/10^{th}$, $1/100^{th}$ or $1/1000^{th}$ of its length and/or width. Light (to be) issued in a respective first direction in this respect means that light issued by a respective first light source is shaped as a beam away from the reflector with a beam angle around a respective optical axis, said respective optical axis corresponding to the respective first direction. A similar reasoning applies to a respective second direction.

The light as issued by the first light sources can be shaped easily by collimators, for example to issue the light as a narrow beam, for example a spot-like beam, used to provide accent lighting or functional lighting, for example for reading. The light as issued by the second light sources can be used to provide diffuse lighting, for example ambient lighting. Such a combination of functional lighting and ambient lighting renders the lighting device suitable for office lighting and for shop lighting in particular.

Instead of being dependent on the light reflective properties of the ceiling, which makes shaping of said light both complex and cumbersome, as is the case in the known lighting device, in the lighting device according to the invention the diffuseness of the diffuse light is easily adjustable by selection of the properties of the reflector. The reflector may be specularly reflective, semi-specularly reflective or diffusely reflective, and its shape may be chosen to generate a narrow beam or wide beam, all in dependence on the desired light to be issued by the lighting device. Shaping of the light to be issued by the lighting device thus is realized in a simple manner. Furthermore, in a very convenient embodiment, the first and second group of light sources are independently controllable as groups; preferably the light sources within a group are independently controllable. It is thus enabled to set the desired lighting setting by switching between operation of only first light sources providing only functional light, only second light sources providing only ambient light and both first and second light sources. Furthermore, use of dimmable and/or color adjustable first and/or second light sources enable fine-tuning of the light settings.

The carrier may be, for example, an open frame or a light transmissive plate, optionally provided with a diffuser to further shape and/or soften the light to be issued by the lighting device. Further, the carrier may be flat, textured, undulated, or slightly bent or curved. The light emission window may be provided with a diffuser as such, i.e. not mounted on the light transmissive carrier. Alternatively, the light transmissive plate and the diffuser are combined into one translucent plate.

An embodiment of the lighting device is characterized in that said first and second light sources mutually are ordered in an alternating manner. This causes the lighting device, during operation, to issue light from its light emission window relatively uniformly, which is experienced as more esthetical and pleasant by observers. Furthermore, said uniform emission of diffuse light to illuminate objects in combination with accent lighting, enhances the natural appearance of said illuminated objects.

An embodiment of the lighting device is characterized in that at least a respective one of the first light sources and a respective second light source are ordered in a stacked arrangement along a respective first direction, said respective second light source being located in between the respective first light source and the reflector. Light issued by the second light sources and reflected back by the reflector towards the light emission window partly impinges on the (first and second) light sources, potentially leading to high light losses. To counteract these high light losses, the first and second light sources are arranged in a stacked position. Yet to further reduce light losses, the surfaces of said light sources on which said reflected light impinges could be (made) light reflective, for example made of light reflective metal, for example aluminum, or provided with a light reflective coating, for example aluminum oxide, to recycle said light.

In an embodiment, the lighting device is characterized in that the light emission window is provided with a light transmissive plate having openings and/or collimator openings with a first end on the side facing the reflector and a second end on a side of the light transmissive plate facing away from the reflector, the first light sources being located at or in a respective opening or collimator opening. Said opening enables air to flow into the housing between the transmissive plate and the reflector along the light sources, thereby attaining cooling of said light sources. Simultaneously or independently, said openings could be collimator openings to (further) collimate and direct light from the first light sources into the desired shaped and/or (third) direction. To achieve this, an embodiment of the lighting device is characterized in that the first light sources are located at a respective first end of said respective collimator opening.

Yet, similar to other embodiments given above, to counteract high light losses and/or improve cooling of the lighting sources, an embodiment of the lighting device is characterized in that both the first light sources and the second light sources are located at a respective collimator opening in a stacked position, the second light sources being located in between the first light sources and the reflector. The emission direction of the first light sources is towards the light emission window (at least in a direction away from the reflector), and the emission direction of the second light sources is towards the reflector.

It is convenient when the number of the first and second light sources in the lighting device is in a ratio of 6:1 to 1:6. This gives ample possibilities to find a desired balance between functional and ambient lighting, while still providing a sufficient amount of light for said balance. A possible alternating arrangement of the first and second light sources has to be adapted in order to be in accordance with the selected ratio between the numbers of first and second light sources.

An embodiment of the lighting device is characterized in that the first light sources have a color temperature tunable in the range of 2000-6000K and the second light sources have a color temperature tunable in the range of 4000-20,000K. Such a lighting device is in particular suitable for the illumination of objects, such as for product illumination in shops and/or illumination of art objects. The object appearance in terms of "texture", "gloss", "sparkle", "modeling", is not only determined by the optical properties of the illuminated objects but also by the properties of the illuminating light; three main properties of said illuminating light are:

R1, the ratio of the intensities I between directional (accent light) and diffuse light:

$$R_1 = \frac{I_{accent}}{I_{diffuse}}$$

R2, the ratio of the difference in color temperature $T_c$ between directional and diffuse light:

$$R_2 = \frac{T_{c,accent}}{T_{c,diffuse}}$$

The shape of the illuminating area (points, lines, areas).

$T_{c,accent}$ for the first light sources is in the range of 2000-6000K and $T_{c,diffuse}$ for the second light sources is in the range of 4000-20,000K.

Preferably, to experience a general better effect of natural illumination of objects, the intensity ratio $R_1$ between accent lighting and diffuse lighting is in the range of $2<=R_1<=4$ and/or the color temperature of the first (accent light generating) light sources is lower, more preferably at least about 500K lower than the color temperature of the second (diffuse light generating) light sources, i.e. preferably $0.25<=R_2<=0.8$.

A lighting device which is characterized in that the reflector is made of an electronically switchable material, for example LCD material. Said material can be switched electronically between a white reflective state and a diffusely transmitting state, enabling outdoor daylight to enter the light module as an energy saving diffuse light source if daylight is available from/via the ceiling.

The invention further relates to a lighting system comprising at least two lighting devices according to the invention. Such a lighting system is in particular suitable to be applied in/as a false ceiling, giving the appearance of a natural way of illuminating a space, for example rooms in shops, museums, or offices.

BRIEF DESCRIPTION OF THE DRAWINGS

The invention will now be further elucidated by means of the schematic drawing to illustrate the many possibilities of the invention. The drawing is by no means intended to limit the scope of the invention to the embodiments shown. Some parts may be exaggerated in size to show particular features. In the drawing.

DETAILED DESCRIPTION

Figure 1:
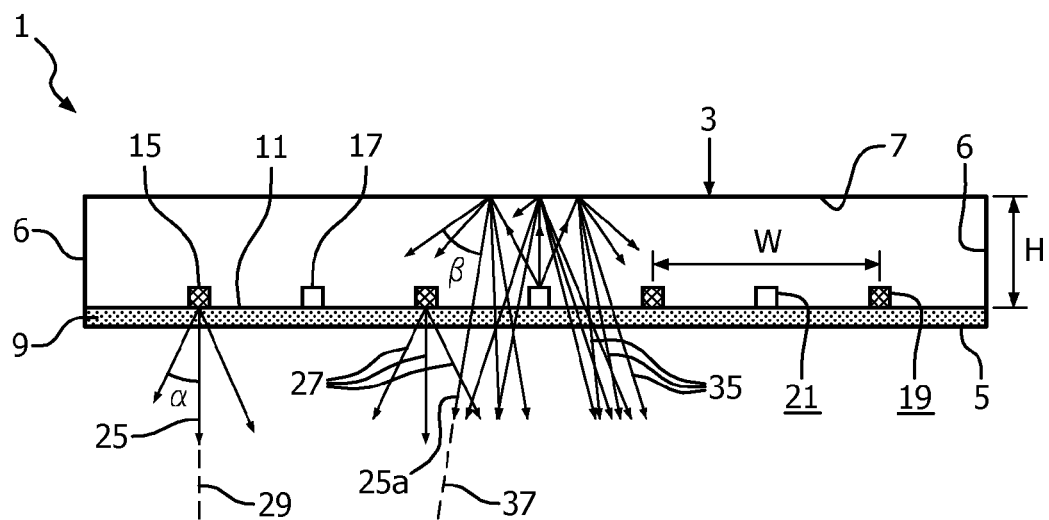
FIG. 1 shows a cross-sectional view of a first embodiment of the lighting device according to the invention.

FIG. 1 shows a cross-sectional view of a first embodiment of the lighting device 1 according to the invention. The lighting device comprises a housing 3 of height H, which housing comprises a light emission window 5 and, opposite thereto, a semi-specular reflective wall as a reflector 7, connected to each other by side walls 6. A planar carrier 9, in the figure a light transmissive, light diffusing plate, which is arranged in between the light emission window and the reflector, has, on a side 11 facing the reflector, a grid 13 (see FIG. 2) of alternating first 15 and second light sources 17 forming a first group 19 and a second group of light sources 21, respectively. The first light sources have a relatively small optical distance to the plate 9, whereas the second light sources, whose light is reflected by a white scattering layer with reflection coefficient of 0.9-1.0 have a relatively large optical distance to said plate. The diffuser is used to make discrete light sources and the grid less visible as well as to further scatter the diffuse light. The diffuser is chosen to have a diffusing angle of maximally 10 degrees. First and second light sources are alternatingly arranged on the grid; adjacent first light sources are mutually spaced apart by a distance W, and halfway in between a second light source is arranged which is spaced apart by a distance 0.5 W from the adjacent first light source. Each of the first light sources has a respective first emission orientation 23 in a respective first direction 25 of a respective first light beam 27 with a beam angle α around a respective first main direction/optical axis 29 away from the reflector. The angle α generally is relatively small, typically about 15°, to provide a narrow light beam, for example for accent lighting. Each of the second light sources has a respective second emission orientation 31 in a respective second direction 33 towards the reflector of a respective light beam which is reflected at the reflector to propagate in a respective first direction 25a. The second beam 35 from the second light source, after being reflected, has a beam angle β around a respective second main direction/optical axis 37, β generally being much larger than α, typically 30° or more, to provide wide beams, for example required for diffuse or flood lighting.

Figure 2:
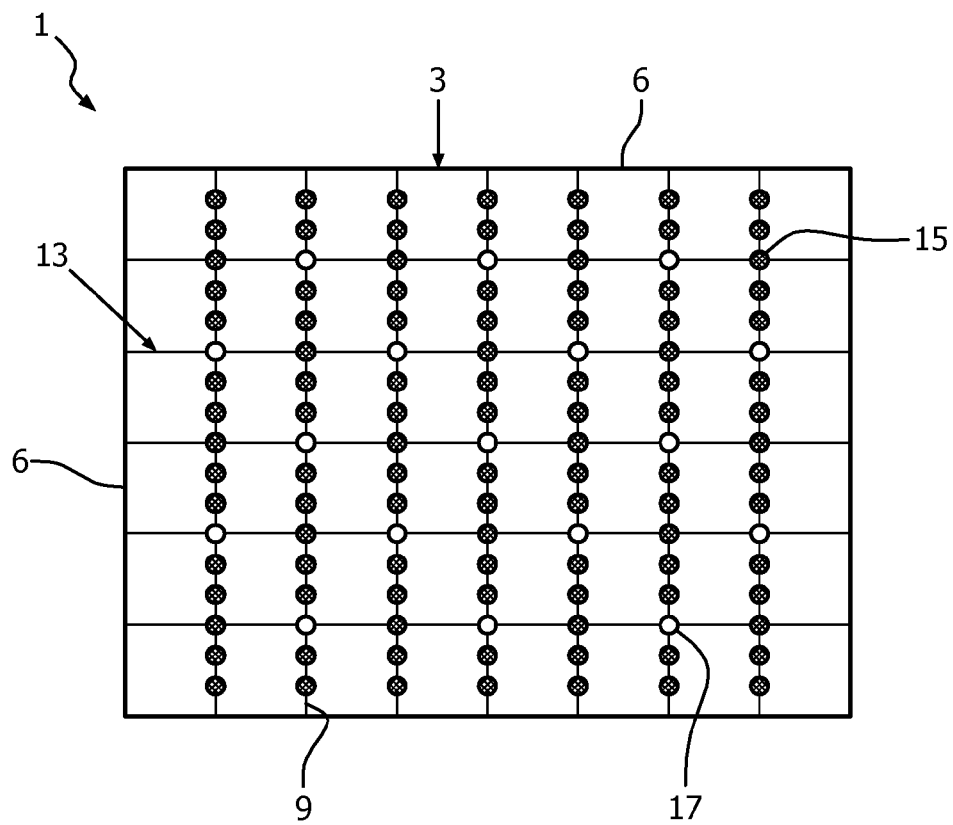
FIG. 2 shows a bottom view of a second embodiment of the lighting device according to the invention.

FIG. 2 shows a bottom view of a second embodiment of the lighting device 1 according to the invention. The carrier 9 is an open frame provided with a grid 13 of first 15 and second 17 light sources, the carrier is fixed to walls 6 of the housing 3. The light sources are dimmable, color tunable LEDs in the figure, but the light sources alternatively could be dimmable miniature halogen lamps. The first light sources are arranged in lines (parallel or randomly oriented), such that the LEDs within a line are much closer, at least 3 times closer, than those between the lines. The first and second light sources are provided in a ratio of 3:1, causing $R_1$ to be about 3, i.e. to be in the favorable range of $2<=R_1<=4$. The alternating arrangement of the first and second light sources is adapted to said ratio.

Figure 3:
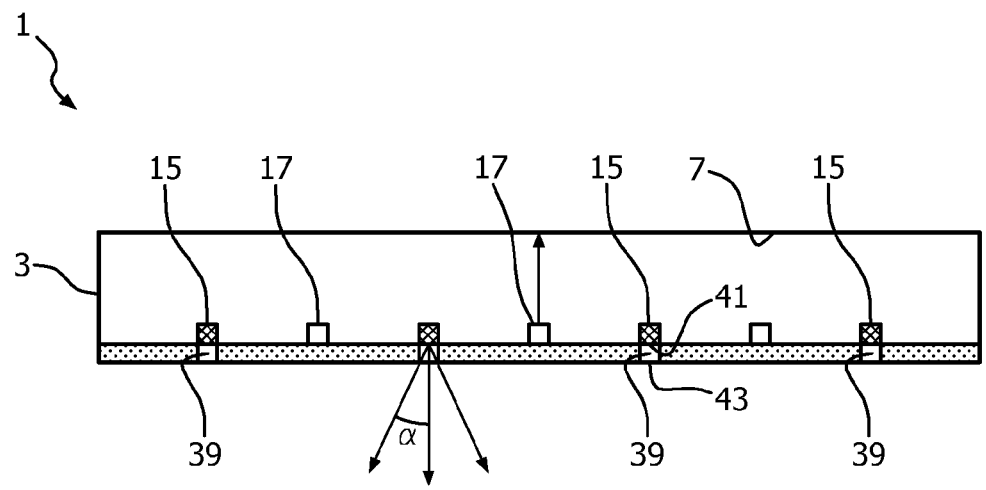
FIG. 3 shows a cross-sectional view of a third embodiment of the lighting device according to the invention.

FIG. 3 shows a cross-sectional view of a third embodiment of the lighting device 1 according to the invention, in which the first 15 and second light sources 17 are alternately arranged, similar to the embodiment shown in FIG. 1. In the embodiment of FIG. 3, the light-diffusing carrier plate 9, for example made of translucent PMMA, is provided with openings 39 for collimator light, with the first light sources 15 being located at a respective first end 41 facing the reflector 7 of a respective opening. The quality of the accent lighting is improved thereby, as the light beams of the first light sources issued at a respective second end 43 of the opening are more collimated and less diffused, i.e. beam angle α is relatively very small, for example 12° or less. Furthermore, less light from the first light sources is scattered back into the housing 3, so that the efficiency of the lighting device is increased.

Figure 4:
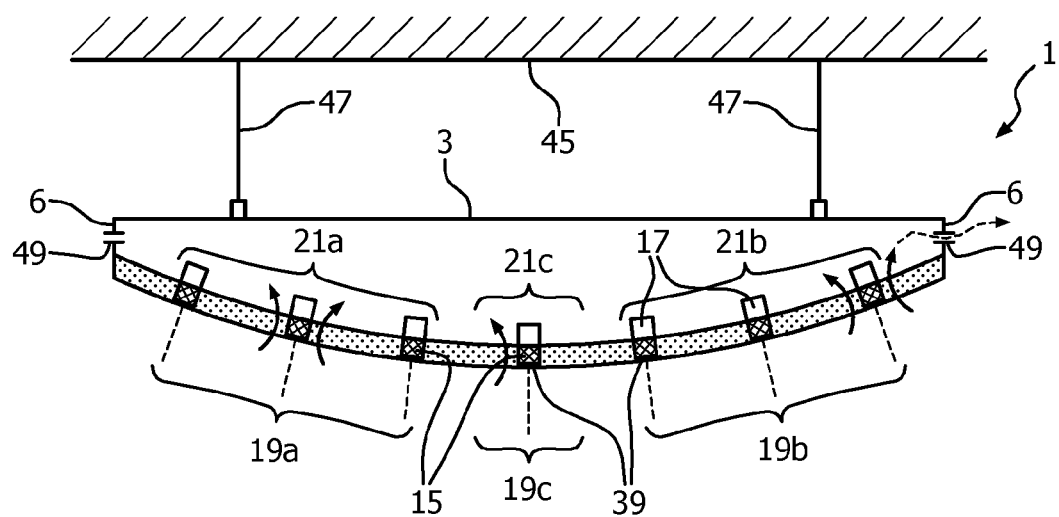
FIG. 4 shows a cross-sectional view of a fourth embodiment of the lighting device according to the invention.

FIG. 4 shows a cross-sectional view of a fourth embodiment of the lighting device 1 according to the invention. The lighting device is a suspended luminaire, suspended from a ceiling 45 via suspension wires 47. The lighting device comprises a stacked arrangement of first 15 and second light sources 17 at collimator openings 39. The second light sources are located in between respective first light sources and the reflector 7. In this embodiment, the carrier 9 is a curved transparent plate, provided with openings 39 to enable air to flow along the first and second light sources for convection cooling, side walls 6 of the housing 3 of the luminaire, for this purpose, being provided with ventilation apertures 49. The first light sources 15 are divided in a first 19a, a second 19b and a third sub-group 19c, the second light sources 17 are divided in a first 21a, a second 21b and a third sub-group 21c, which sub-groups are all independently controllable. Each sub-group has a respective direction in which light is issued during operation of said sub-group.

Figure 5:
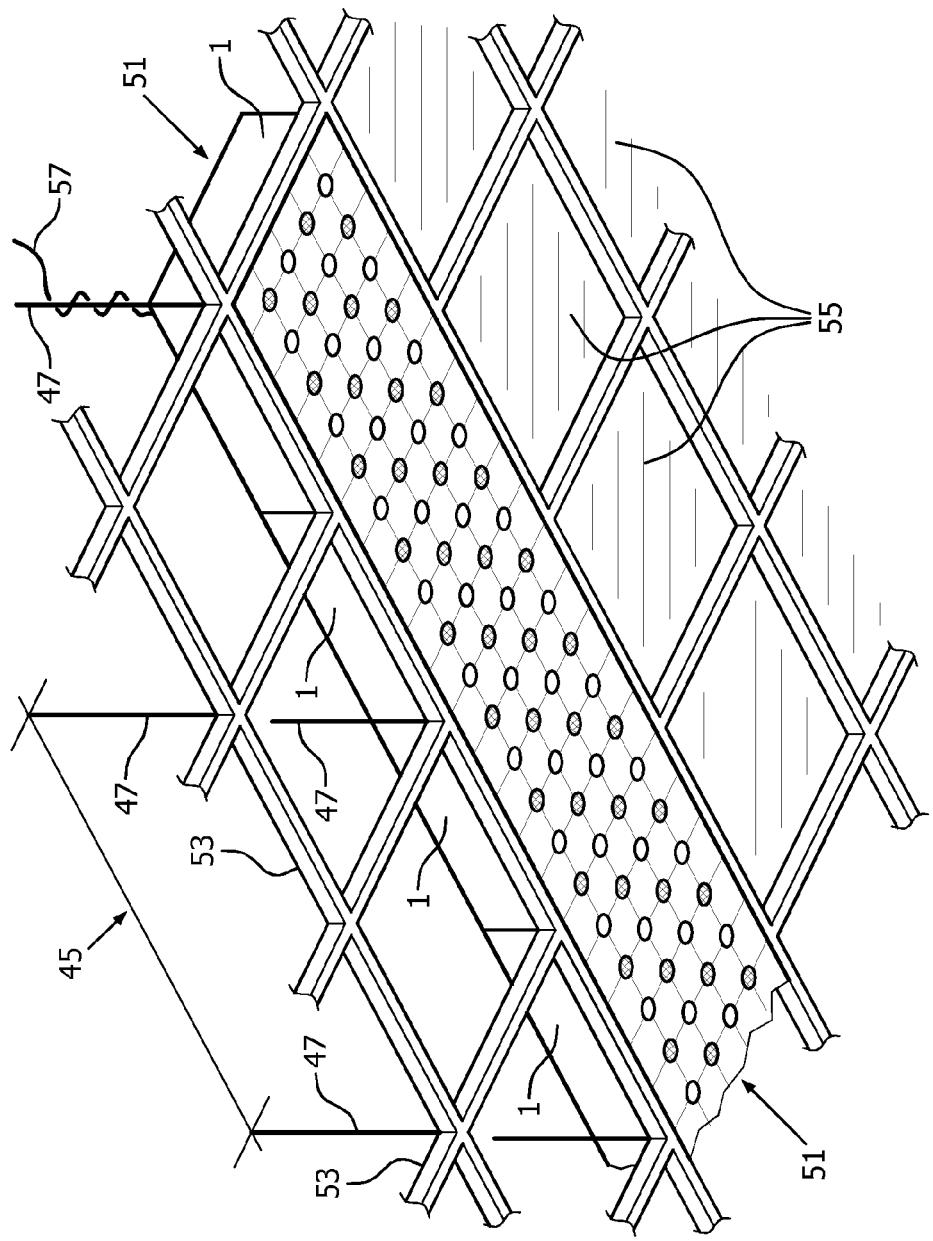
FIG. 5 shows a perspective bottom view of a lighting system according to the invention, which comprises a plurality of lighting devices according to the invention.

FIG. 5 shows a perspective bottom view of a lighting system 51 according to the invention. The lighting system is mounted onto a ceiling frame 53 suspended from false ceiling 45 by suspension cables 47 and comprises a plurality, i.e. a row of four, of lighting devices 1 according to the invention. Alternatively, a two-dimensional arrangement of lighting devices is possible as well. Part of the ceiling frame is provided with ceiling tiles 55, and the dimensions of the ceiling tiles and of the lighting devices match to enable easy exchange of ceiling tiles by lighting devices and vice versa. Electrical connection of the lighting devices/system is established via electric cables 57 wound around respective suspension cables.

The invention claimed is:

1. A lighting device comprising:
   a housing comprising a light emission window and, opposite thereto, a reflector,
   a planar carrier between the light emission window and the reflector, the planar carrier being light transmissive and comprising, at least on a side facing the reflector, a grid of a plurality of light sources,
   the plurality of light sources comprising a first group of first light sources and a second group of second light sources, wherein each of the first light sources has a respective first emission orientation in a respective first direction away from the reflector, and each of the second light sources has a respective second emission orientation to issue light towards the reflector, wherein the light issued from the second light sources, after reflection by the reflector, is redirected substantially into the respective first direction;
   wherein the light emission window has openings with a first end on the side facing the reflector and a second end on a side of the planar carrier facing away from the reflector, each of the first light sources being located at a respective one of the openings.

2. The Lighting device as claimed in claim 1, wherein the first and second groups are independently controllable.

3. The Lighting device as claimed in claim 1, wherein at least a respective one of the first light sources is disposed in a stacked arrangement with a respective one of the second light sources along a respective first direction, said respective one of the second light sources being located between said respective one of the first light sources and the reflector.

4. The Lighting device as claimed in claim 1, wherein each of the first light sources is located at the first end of said respective one of the openings.

5. The Lighting device as claimed in claim 1, wherein each of the first light sources and the second light sources is located at a respective one of the openings in a stacked arrangement and between the reflector and the side of the carrier plate facing away from the reflector, each of the second light sources being located between the first light sources and the reflector.

6. The Lighting device as claimed in claim 1, wherein a quantity of the first and second light sources is in a ratio of 6:1 to 1:6.

7. The Lighting device as claimed in claim 1, wherein the first light sources have a color temperature tunable between 2,000-6,000K and the second light sources have a color temperature tunable between 4,000-20,000K.

8. The Lighting device as claimed in claim 1, wherein the reflector is made of an electronically switchable material.

9. A Lighting system comprising at least two of the lighting devices as claimed in claim 1.

10. The Lighting system as claimed in claim 9, wherein the lighting devices are arranged next to each other to form at least a part of a false ceiling.

* * * * *